May 7, 1968  J. R. HARNISH  3,381,487
REFRIGERATION SYSTEMS WITH ACCUMULATOR MEANS
Filed Sept. 26, 1966  2 Sheets-Sheet 1
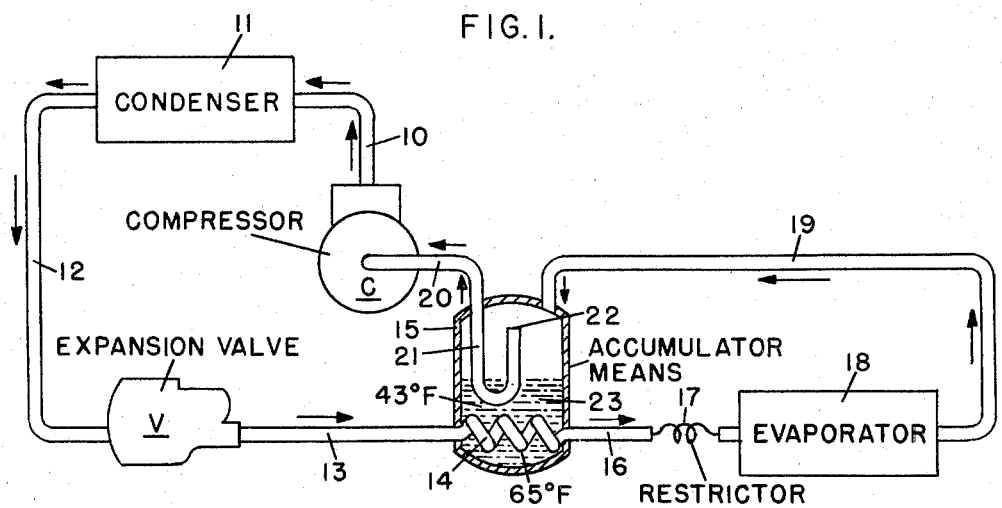
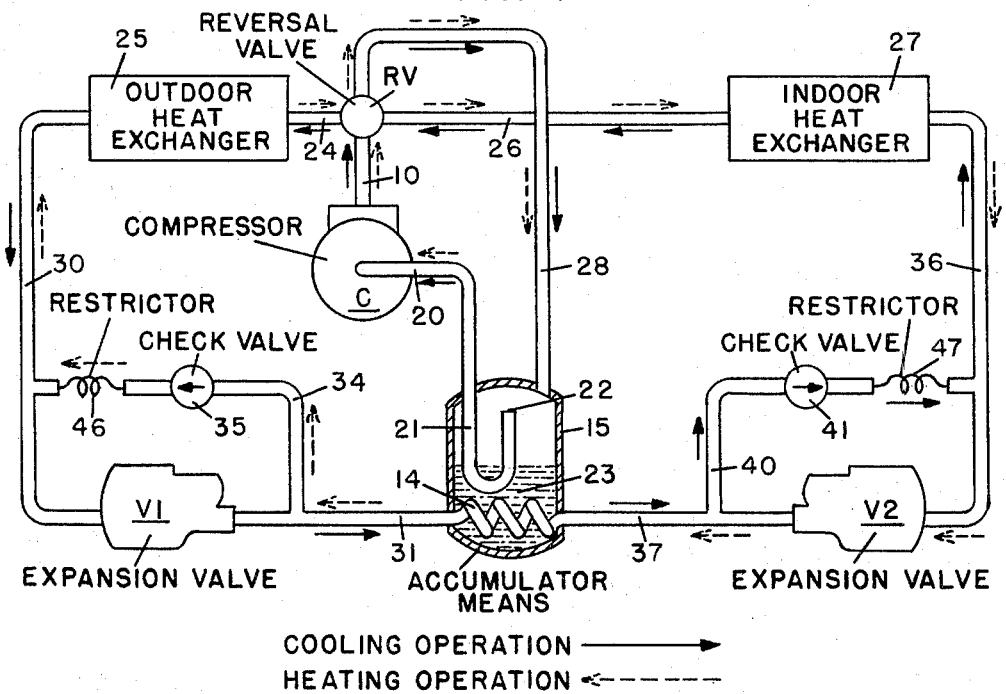
INVENTOR:
JAMES R. HARNISH,
BY Robert J. Palmer
ATTORNEY United States Patent Office 3,381,487
Patented May 7, 1968

3,381,487
REFRIGERATION SYSTEMS WITH
ACCUMULATOR MEANS
James R. Harnish, Staunton, Va., assignor to Westinghouse Electric Corporation, Pittsburgh, Pa., a corporation of Pennsylvania
Filed Sept. 26, 1966, Ser. No. 581,877
11 Claims. (Cl. 62—117)

ABSTRACT OF THE DISCLOSURE

A refrigeration system has a compressor, a condenser, an expansion valve, a heat exchange coil within an accumulator, a flow restrictor, an evaporator, and the accumulator connected in series in the order named. Refrigerant liquid and flash gas from the expansion valve flow through the coil within the accumulator, and the restrictor into the evaporator. The expansion valve overfeeds the evaporator so that refrigerant liquid flows into the accumulator where it is evaporated by heat from the flash gas and liquid flowing through the coil, some of the flash gas being condensed by this heat exchange, aiding in overfeeding the evaporator.

---

This invention relates to refrigeration systems, and relates more particularly to refrigeration systems used in the conditioning of air for comfort.

Thermostatic expansion valves are the most widely used refrigeration controls. They operate to maintain constant degrees of superheat at evaporator outlets. Evaporator coils used with such valves usually have additional surfaces near their outlets for superheating suction gas. Thus, all of the refrigerant liquid supplied by a thermostatic expansion valve to an evaporator coil is evaporated within the latter.

In multi-zone, direct expansion, air conditioning systems, as well as in other systems having varying air flow over evaporator coils, at reduced air flow, refrigerant liquid distribution through the evaporator coils becomes poor so that the usual thermostatic expansion valve cannot operate properly. Another disadvantage of a thermostatic expansion valve is that when used with a condenser coil cooled by outdoor air, at low outdoor temperatures, the condensing pressure is insufficient to operate such an expansion valve properly.

This invention uses an expansion valve which meters refrigerant at the rate at which it is condensed, and flows the expanded refrigerant consisting of flash gas and liquid, through a heat exchange coil arranged to evaporate refrigerant liquid within an accumulator means, to an evaporator, overfeeding the latter. Unevaporated refrigerant liquid and gas flow from the evaporator into the accumulator means. Gas separated from the liquid within the accumulator means, flows to the suction inlet of the associated compressor. Heat from the refrigerant flowing through the heat exchange coil evaporates refrigerant liquid within the accumulator means at substantially the rate at which the unevaporated liquid flows from the evaporator into the accumulator means, thus preventing refrigerant liquid from flowing to the compressor. Some of the flash gas is condensed by this heat exchange, aiding in overfeeding the evaporator.

Among the advantages of this invention, control is not affected by varying air flow across an evaporator coil; the evaporator coil does not require superheating surface; the entire inner surface of the evaporator coil is wetted without liquid carry-over to the compressor; the increased liquid flow increases heat transfer; excess liquid is supplied to the evaporator coil without a liquid pump; the compressor head pressure is automatically controlled, and a condenser coil can be used more effectively at low ambient temperatures. When used in a heat pump, there are the additional advantages that the indoor air coil, when operated as a condenser coil for indoor air heating, is more effective at low outdoor temperatures since excess liquid is not stored within it, and there is no liquid flow into the compressor to dilute its lubricant at the instant of reversal when the coil that has been operating as a condenser is connected through the compressor with the coil that has been operating as an evaporator.

Advantages of this invention over that disclosed in my Patent No. 3,264,837, are that the refrigerant charge can be smaller, and the expansion valve responds more quickly since located nearer the operating condenser.

An object of this invention is to overfeed an evaporator with expanded refrigerant, to flow unevaporated refrigerant liquid from the evaporator into an accumulator means, and to evaporate refrigerant liquid within the accumulator means with heat from the expanded refrigerant.

Another object of this invention is to drain a condenser through an expansion valve which supplies flash gas and liquid through a heat exchange coil arranged to evaporate refrigerant liquid within an accumulator means, to an evaporator to overfeed the latter, to flow gas and unevaporated liquid from the evaporator into the accumulator means, and to evaporator refrigerant liquid within the accumulator means with heat from the flash gas and liquid flowing through the heat exchange coil while condensing some of the flash gas by this heat exchange.

Another object of this invention is to reduce the refrigerant charge in a system in which an evaporator is overfed, and in which unevaporated refrigerant liquid flowing from the evaporator is evaporated within an accumulator means.

Another object of this invention is to increase the speed of response of an expansion valve in a system in which an evaporator is overfed, and in which unevaporated refrigerant liquid flowing from the evaporator is evaporated within an accumulator means.

This invention will now be described with reference to the annexed drawings, of which:

FIG. 1 is a diagrammatic view of a non-reversible refrigeration system embodying this invention;

FIG. 2 is a diagrammatic view of a heat pump embodying this invention, and

Description of FIG. 1

Figure 3:
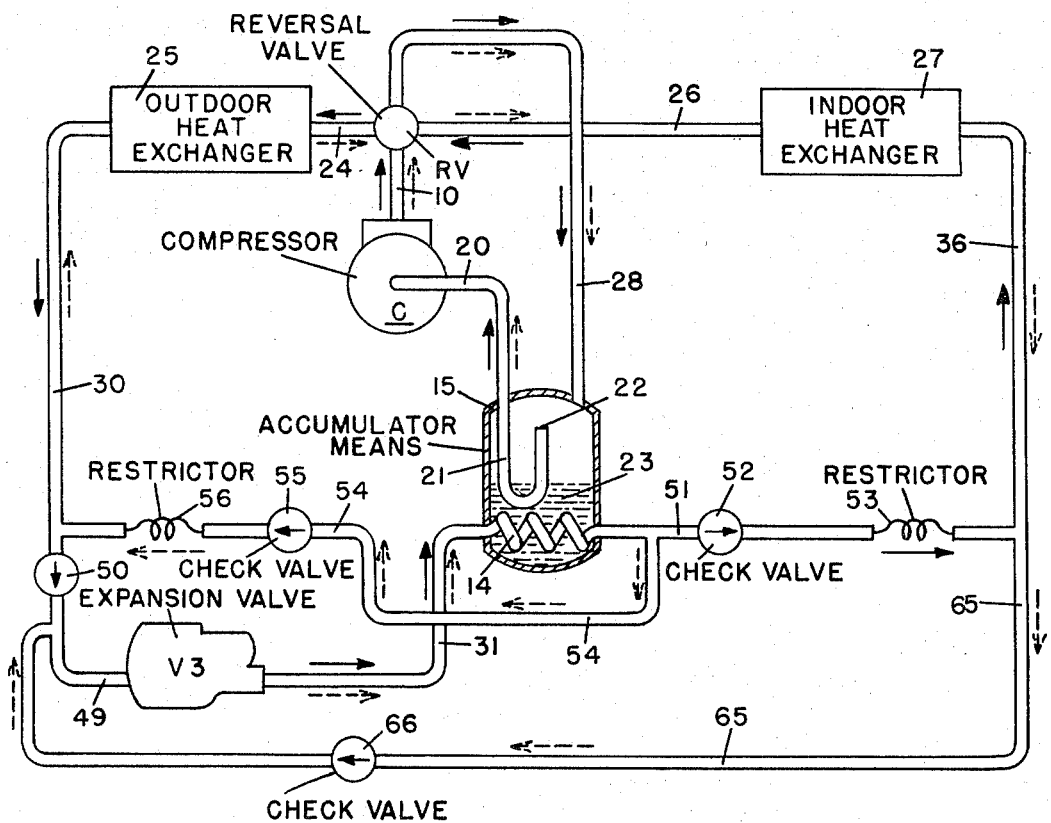
FIG. 3 is a diagrammatic view of another heat pump embodying this invention.

The discharge gas outlet of a refrigerant compressor C is connected by discharge gas tube 10 to a condenser 11 which is connected by a liquid tube 12 to an expansion valve V which keeps the condenser 11 drained. The illustrated valve V is a high pressure float valve disclosed in detail on pages 324–325 of the textbook "Principles of Refrigeration" by R. J. Dossat, published in 1961 by John Wiley & Sons, Inc., although it could be a steam trap such as is disclosed on pages 658–659 of the textbook "Steampower Plant Engineering" by G. F. Gebhardt, Fourth Edition, published by John Wiley & Sons, Inc. For most duties where the condenser 11 need not be kept emptied, a subcooling control valve such as is disclosed in my previously mentioned patent, can be used as the expansion valve. The outlet of the valve V is connected by a tube 13 to a heat exchange coil 14 immersed in liquid 23 within the sump of an accumulator means 15. The coil 14 is connected by a tube 16 which may contain a restrictor such as a capillary tube 17, to an evaporator 18. The latter is connected by a tube 19 to the upper portion of the accumulator means 15. A suction gas tube 20 having a U-shaped portion 21 with an open end 22, within the accumulator means 15, is connected to the suction inlet of the compressor C. The system is overcharged with refrigerant so that a quantity of refrigerant liquid is normally in the sump of the accumulator means 15.

*Operation of FIG. 1*

The compressor C supplies discharge gas through the tube 10 into the condenser 11. Liquid condensed within the condenser 11 flows through the tube 12 into the valve V which reduces the pressure of the liquid, supplying flash gas and liquid through the tube 13, the coil 14, and the tubes 16 and 17 into the evaporator 18 at the rate at which refrigerant is condensed within the condenser 11, thus overfeeding the evaporator 18. Gas and unevaporated refrigerant liquid flow from the evaporator 18 through the tube 19 into the accumulator means 15. Gas separated from the liquid within the accumulator means 15 flows through the suction gas tube 20 to the suction inlet of the compressor C.

The pressure within the heat exchange coil 14 is higher than that within the accumulator means 15 due to the pressure drops within the tubes 16 and 17, the evaporator 18 and the tube 19, resulting in a higher temperature within the coil 14 than within the accumulator means 15. The heat exchange between the liquid within the sump of the accumulator means 15, and the coil 14, causes some of the flash gas within the coil 14 to condense, increasing the quantity of liquid supplied to the evaporator 18, and causes a quantity of liquid substantially equal to that flowing from the evaporator 18 into the accumulator means 15, to be evaporated.

A system in which a subcooling control valve should not be used as an expansion valve, is one in which a compressor is unloaded. In such a system, the condensing temperature at full load may be 30° F. above the entering air temperature. Thus, 10° F. subcooling as disclosed in my previously mentioned patent, can easily be obtained since the refrigerant is cooled only to within 20° F. of the entering air. When the compressor of such a system is unloaded to 25% capacity, the condenser coil is oversized, and the condensing temperature would be approximately 7.5° higher than the entering air temperature. To obtain 10° F. subcooling, a relatively large quantity of refrigerant liquid would have to be backed up in the condenser coil by a subcooling control valve. With a high pressure float valve or a steam trap operating as an expansion valve, the condenser coil is kept drained, and charge variation with unloading type compressors is not a problem.

Since the tube 13, the coil 14, and the tubes 16 and 17 contain some flash gas instead of all liquid, the refrigerant charge for a system embodying this invention, is less than that for the systems disclosed in my previously mentioned patent. Also, since the expansion valve V is located much closer to the condenser 11 than the subcooling control valves of the systems of my patent are to their associated operating condensers, the expansion valve V responds more quickly to system changes, especially where relatively long refrigerant flow lines are required as in some installations.

*Description of FIG. 2*

Those components of FIG. 2 which correspond to components of FIG. 1 are given the same reference characters. Compressor C is connected by discharge gas tube 10 to a conventional refrigerant reversal valve RV which is connected by tube 24 to outdoor heat exchanger 25, and by tube 26 to indoor heat exchanger 27. The valve RV is also connected by tube 28 to the upper portion of accumulator means 15. The outdoor heat exchanger 25 is connected by tube 30 to the inlet of expansion valve V1, the outlet of which is connected by tube 31 to one end of heat exchange coil 14 immersed in liquid 23 in the sump of the accumulator means 15. The tubes 30 and 31 are connected by a tube 34 containing a check-valve 35, and which may contain a restrictor such as a capillary tube 46. The indoor heat exchanger 27 is connected by a tube 36 to the inlet of expansion valve V2, the outlet of which is connected by tube 37 to the other end of the coil 14. The tubes 36 and 37 are connected by a tube 40 containing a check-valve 41, and which may contain a restrictor such as a capillary tube 47. The valves V1 and V2 are similar to the valve V of FIG. 1, and could be high pressure float valves, subcooling control valves, or steam traps. The upper portion of the accumulator means 15 is connected by suction gas tube 20 having a U-shaped portion 21 with an open end 22 within the accumulator means 15, to the suction inlet of the compressor C.

*Cooling operation of FIG. 2*

The solid-line arrows alongside the tubing of FIG. 2 show the direction of refrigerant flow during cooling operation. Discharge gas from the compressor C flows through the tube 10, the reversal valve RV, and the tube 24 into the outdoor heat exchanger 25 operating as a condenser. Liquid from the heat exchanger 25 flows through the tube 30 into the expansion valve V1. Flash gas and liquid flow from the valve V1 through the tube 31, the coil 14, the tubes 37 and 40, the check-valve 41, and the tubes 47 and 36 into the indoor heat exchanger 27 operating as an evaporator, overfeeding the heat exchanger 27. Gas and unevaporated refrigerant liquid flow from the heat exchanger 27 through the tube 26, the reversal valve RV, and the tube 28 into the accumulator means 15. Gas separated from the liquid within the accumulator means 15 flows through the suction gas tube 20 to the suction inlet of the compressor C.

The expansion valve V1 drains the heat exchanger 25 operating as a condenser, and overfeeds the heat exchanger 27 operating as an evaporator. The heat exchange coil 14 evaporates with heat from the liquid and flash gas flowing through it, refrigerant liquid within the accumulator means 15 at substantially the rate at which refrigerant liquid flows from the heat exchanger 27 into the accumulator means 15, the heat exchange action involved resulting in some flash gas within the coil 14 being condensed, this aiding in overfeeding the heat exchanger 27.

*Heating operation of FIG. 2*

The dashed-line arrows alongside the tubing of FIG. 2 shows the direction of refrigerant flow during heating operation. Discharge gas from the compressor C flows through the tube 10, the reversal valve RV, and the tube 26 into the indoor heat exchanger 27 operating as a condenser. Liquid from the heat exchanger 27 flows through the tube 36 into the expansion valve V2. Flash gas and liquid flow from the valve V2 through the tube 37, the coil 14, the tubes 31 and 34, the check-valve 35, and the tubes 46 and 39 into the outdoor exchanger 25 operating as an evaporator, overfeeding the latter. Gas and unevaporated liquid flow from the heat exchanger 25 through the tube 24, the reversal valve RV, and the tube 28 into the accumulator means 15. Gas separated from the liquid within the accumulator means 15 flows through the suction gas tube 20 to the suction inlet of the compressor C.

The expansion valve V2 drains the heat exchanger 27 operating as a condenser, and overfeeds the heat exchanger 25 operating as an evaporator. The heat exchange coil 14 evaporates with heat from the liquid and flash gas flowing through it, refrigerant liquid within the accumulator means 15 at substantially the rate at which refrigerant liquid flows from the heat exchanger 25 into the accumulator means 15, the heat exchange action involved resulting in some flash gas within the coil 14 being condensed, thus aiding in overfeeding the heat exchanger 25.

Description of FIG. 3

The heat pump of FIG. 3 is generally similar to that of FIG. 2, and differs therefrom by using a single expansion valve instead of two expansion valves, and by using four check-valves instead of two check-valves. Components of FIG. 3 which correspond to those of FIG. 2 are given the same reference characters. Compressor C is connected by discharge gas tube 10 to reversal valve RV which is connected by tube 24 to outdoor exchanger 25, and by tube 26 to indoor heat exchanger 27. The valve RV is also connected by tube 28 to the upper portion of accumulator means 15. The heat exchanger 25 is connected by tube 30 containing a check-valve 50, and by tube 49, to the inlet of expansion valve V3, the outlet of which is connected by tube 31 to one end of coil 14 immersed in liquid 23 in the sump of the accumulator means 15. The other end of the coil 14 is connected by tube 51 containing a check-valve 52, and which may contain a restrictor such as a capillary tube 53, and by tube 36 to the indoor heat exchanger 27. The tube 30 between the check-valve 50 and the outdoor exchanger 25, is connected by a tube 54 containing a check-valve 55, and which may contain a restrictor such as a capillary tube 56, to the tube 51 between the coil 14 and the check-valve 52. The tube 36 is connected by tube 65 containing a check-valve 66 to the tube 30 between the check-valve 50 and the expansion valve V3. The upper portion of the accumulator means 15 is connected by suction gas tube 20 having a U-shaped portion 21 with an open end 22 within the accumulator means 15, to the suction inlet of the compressor C. The valve V3 can be one of those described in the foregoing in connection with FIG. 1.

Cooling operation of FIG. 3

The solid-line arrows alongside the tubing of FIG. 3 show the direction of refrigerant flow during cooling operation. Discharge gas from the compressor C flows through the tube 10, the reversal valve RV, and the tube 24 into the outdoor exchanger 25 operating as a condenser. Liquid flows from the heat exchanger 25 through the tube 30, the check-valve 50, and the tube 49 into the expansion valve V3, and from the latter through the tube 31, the coil 14, the tube 51, the check-valve 52, and the tubes 53 and 36 into the indoor heat exchanger 27 operating as an evaporator, overfeeding the heat exchanger 27. Gas and unevaporated liquid flow from the heat exchanger 27 through the tube 26, the reversal valve RV, and the tube 28 into the accumulator means 15. Gas separated from the liquid within the accumulator means 15 flows through the suction gas tube 20 to the suction inlet of the compressor C.

The valve V3 operates as does the valve V1 of FIG. 2 as described in the foregoing in connection with the cooling operation of FIG. 2. The coil 14 operates as does the coil 14 of FIG. 2 during cooling operation.

Heating operation of FIG. 3

The dashed-line arrows alongside the tubing of FIG. 3 show the direction of refrigerant flow during heating operation. Discharge gas from the compressor C flows through the tube 10, the reversal valve RV, and the tube 26 into the indoor heat exchanger 27 operating as a condenser. Liquid from the heat exchanger 27 flows through the tubes 36 and 65, the check-valve 66, the tube 49, the expansion valve V3, the tube 31, the coil 14, the tube 54, the check-valve 55, and the tubes 56 and 30 into the outdoor heat exchanger 25 operating as an evaporator, overfeeding the heat exchanger 25. Gas and unevaporated liquid flow from the heat exchanger 25 through the tube 24, the reversal valve RV, and the tube 28 into the accumulator means 15. Gas separated from the liquid within the accumulator means 15 flows through the suction gas tube 20 to the suction inlet of the compressor C.

The valve V3 operates as does the valve V2 of FIG. 2 as described in the foregoing in connection with the heating operation of FIG. 2. The coil 14 operates as does the coil 14 of FIG. 2 during heating operation.

Since the expansion valves used in all embodiments of this invention meter refrigerant at the rate at which it is condensed, they can supply sufficient refrigerant liquid to operating evaporators to prevent the latter from becoming starved at low outdoor temperatures when the use of thermostatic expansion valves, or capillary tubes used as expansion means, would result in the operating evaporators becoming starved. Since the operating condensers are kept drained, their heat transfer and efficiency are increased.

What is claimed is:

1. The method of operating a refrigeration system containing a compressor, a condenser, an expansion valve, a heat exchange coil, an evaporator, and accumulator means connected in series in the order named, which comprises overcharging said system with refrigerant so that there is always a quantity of refrigerant liquid within said accumulator means, flowing refrigerant liquid and flash gas from said valve through said coil to said evaporator to overfeed said evaporator at all loads on said evaporator during normal operation of said system, flowing gas and unevaporated refrigerant liquid from said evaporator into said accumulator means, providing sufficient resistance in the flow path from said coil through said evaporator into said accumulator means to provide substantially higher pressure and temperature within said coil than within said accumulator means, evaporating refrigerant liquid within said accumulator means with heat from said coil at substantially the rate at which unevaporated refrigerant liquid flows from said evaporator into said accumulator means, and condensing flash gas within said coil for aiding in overfeeding said evaporator, said expansion valve maintaining said condenser drained of liquid.

2. A refrigeration system comprising a compressor, a condenser, an expansion valve, a heat exchange coil, an evaporator, and accumulator means connected in series in the order named, the refrigerant charge in said system being so large that there is always a quantity of refrigerant liquid within said accumulator means, said coil being arranged to evaporate refrigerant liquid within said accumulator means with heat from flash gas and liquid flowing from said expansion valve through said coil, flash gas within said coil being condensed by this heat exchange, said expansion valve operating to continously overfeed said evaporator at all loads on the latter during normal operation of said system so that unevaporated refrigerant liquid flows from said evaporator into said accumulator means at substantially the rate at which refrigerant liquid is evaporated within said accummulator means, said expansion valve operating to maintain said condenser emptied of refrigerant liquid.

3. A refrigeration system as claimed in claim 2 in which said coil is connected to said evaporator through a restrictor.

4. A heat pump comprising a refrigerant compressor; an outdoor heat exchanger; an indoor heat exchanger; a first expansion valve; a second expansion valve; accumulator means; a heat exchange coil arranged to heat liquid within said accumulator means; a first check-valve; a second check-valve; means, when indoor cooling is required, for routing refrigerant from said compressor through said outdoor exchanger operating as a condenser, said first expansion valve, said coil, said second check-valve, and said indoor exchanger operating as an evaporator, into said accumulator means, and routing gas from said accumulator means to said compressor, and, when indoor heating is required, for routing refrigerant from said compressor through said indoor exchanger operating as a condenser, said second expansion valve, said coil, said first check-valve, and said outdoor exchanger operating as an evaporator into said accumulator means, and routing gas from said accumulator means to said compressor; said first expansion valve overfeeding said indoor exchanger when the latter is operating as an evaporator, so that gas and unevaporated refrigerant liquid flow from said indoor exchanger into said accumulator means, said second expansion valve overfeeding said outdoor exchanger when the latter is operating as an evaporator, so that gas and unevaporated refrigerant liquid flow from said outdoor exchanger into said accumulator means; said heat pump being overcharged with refrigerant so that there is always a quantity of refrigerant liquid within said accumulator means; the expanded refrigerant flowing through said coil evaporating refrigerant liquid within said accumulator means at substantially the rate at which unevaporated refrigerant liquid flows from the one of said exchangers that is operating as an evaporator, into said accumulator means, flash gas within said coil being condensed by this heat exchanger, and aiding in overfeeding the one of said exchangers that is operating as an evaporator.

5. A heat pump as claimed in claim 4 in which said expansion valves maintain said exchangers, when operating as condensers, emptied of liquid.

6. A heat pump as claimed in claim 5 in which a first restrictor is connected between said first check-valve and said outdoor exchanger, and in which a second restrictor is connected between said second check-valve and said indoor exchanger.

7. A heat pump as claimed in claim 4 in which a first restrictor is connected between said first check-valve and said outdoor exchanger, and in which a second restrictor is connected between said second check-valve and said indoor exchanger.

8. A heat pump comprising a refrigerant compressor; an outdoor heat exchanger; an indoor heat exchanger; an expansion valve; accumulator means; a heat exchange coil arranged to heat liquid within said accumulator means; first; second; third; and fourth check-valves; and means, when indoor cooling is required, for routing refrigerant from said compressor through said outdoor exchanger operation as a condenser, said first check-valve, said expansion valve, said coil, and said second check-valve, and said indoor exchanger operating as an evaporator, into said accumulator means, and for routing gas from said accumulator means to said compressor, and, when indoor heating is required, for routing refrigerant from said compressor through said indoor exchanger operating as a condenser, said third check-valve, said expansion valve, said coil, said fourth check-valve, and said outdoor exchanger operating as an evaporator, into said accumulator means, and for routing gas from said accumulator means to said compressor; said expansion valve overfeeding the one of said exchangers that is operating as an evaporator so that gas and unevaporated refrigerant liquid flow from the one of said exchangers that is operating as an evaporator into said accumulator means; said heat pump being overcharged with refrigerant so that there is always a quantity of refrigerant liquid within said accumulator means; the expanded refrigerant flowing through said coil evaporating refrigerant liquid within said accumulator means at substantially the rate at which unevaporated refrigerant liquid flows from the one of said exchangers that is operating as an evaporator into said accumulator means, flash gas within said coil being condensed by this heat exchange, and aiding in overfeeding the one of said exchangers that is operating as an evaporator.

9. heat pump as claimed in claim 8 in which said expansion valve maintains the one of said exchangers that is operating as a condenser, emptied of liquid.

10. A heat pump as claimed in claim 9 in which a first restrictor is connected betweenn said second check-valve and said indoor exchanger, and in which a second restrictor is connected between said fourth check-valve and said outdoor exchanger.

11. A heat pump as claimed in claim 8 in which a first restrictor is connected between said second check-valve and said indoor exchanger, and in which a second restrictor is connected between said fourth check-valve and said outdoor exchanger.

References Cited

UNITED STATES PATENTS

| | | | |
|---|---|---|---|
| 2,966,043 | 12/1960 | Ross | 62—174 |
| 3,213,637 | 10/1965 | Halls | 62—196 X |
| 3,246,482 | 4/1966 | Harnish | 62—174 X |
| 3,264,837 | 8/1966 | Harnish | 62—117 |
| 3,283,524 | 11/1966 | Byron | 62—115 |

LLOYD L. KING, *Primary Examiner.*